(12) United States Patent
Sawada et al.

(10) Patent No.: US 9,021,789 B2
(45) Date of Patent: May 5, 2015

(54) DEGRADATION DIAGNOSTIC APPARATUS FOR NOX CATALYST

(75) Inventors: Hiroshi Sawada, Gotenba (JP); Yasushi Iwazaki, Ebina (JP); Toru Kidokoro, Hadano (JP); Shinichiro Imamura, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 604 days.

(21) Appl. No.: 12/449,987

(22) PCT Filed: Mar. 6, 2008

(86) PCT No.: PCT/JP2008/054550
§ 371 (c)(1),
(2), (4) Date: Sep. 4, 2009

(87) PCT Pub. No.: WO2008/108499
PCT Pub. Date: Sep. 12, 2008

(65) Prior Publication Data
US 2010/0083637 A1    Apr. 8, 2010

(30) Foreign Application Priority Data
Mar. 7, 2007 (JP) ................. 2007-057674

(51) Int. Cl.
*F01N 3/00* (2006.01)
*F01N 11/00* (2006.01)
(Continued)

(52) U.S. Cl.
CPC ............. *F01N 11/00* (2013.01); *B01D 53/90* (2013.01); *B01D 53/9431* (2013.01);
(Continued)

(58) Field of Classification Search
CPC ..... F02D 41/029; F01N 9/002; F01N 3/0842; F01N 3/035; F01N 13/02
USPC ................... 60/277, 285, 286, 295
See application file for complete search history.

(56) References Cited

U.S. PATENT DOCUMENTS 6,216,449 B1 * 4/2001 Strehlau et al. ............ 60/274
6,263,666 B1 * 7/2001 Kubo et al. ................ 60/277
(Continued)

FOREIGN PATENT DOCUMENTS

GB    2 342 597 A    4/2000
GB    2342597 A  *  4/2000  ............. F02D 41/02
(Continued)

OTHER PUBLICATIONS

International Preliminary Report on Patentability issued for International Application No. PCT/JP2008/054550 on Sep. 8, 2009 (translation issued on Sep. 29, 2009).
(Continued)

*Primary Examiner* — Thomas Denion
*Assistant Examiner* — Patrick Maines
(74) *Attorney, Agent, or Firm* — Oliff PLC

(57) ABSTRACT

A NOx amount capable of being absorbed by a criteria catalyst as a boundary between degradation and normality is supplied to a NOx storage reduction catalyst and thereafter, a reducer amount corresponding to the NOx amount is supplied by a rich spike operation. Degradation of the NOx catalyst is determined based upon the output of the NOx sensor at this time. Since the degradation of the NOx catalyst is determined only by a magnitude of the NOx sensor output, the degradation diagnosis can be performed with high precision. While the catalyst is normal, the excessive reducers are not supplied and therefore, deterioration of the fuel consumption can be prevented.

6 Claims, 7 Drawing Sheets

(51) Int. Cl.
*B01D 53/90* (2006.01)
*B01D 53/94* (2006.01)
*F01N 3/08* (2006.01)
*F02D 41/02* (2006.01)
*F02D 41/14* (2006.01)

(52) U.S. Cl.
CPC ..... *B01D 53/9495* (2013.01); *B01D 2258/012* (2013.01); *F01N 3/0871* (2013.01); *F01N 2250/02* (2013.01); *F01N 2560/026* (2013.01); *F02D 41/0275* (2013.01); *F02D 41/146* (2013.01); *F02D 2041/1468* (2013.01); *Y02T 10/20* (2013.01); *Y02T 10/47* (2013.01)

(56) References Cited

U.S. PATENT DOCUMENTS

| | | | |
|---|---|---|---|
| 6,698,188 | B2 | 3/2004 | Irisawa et al. |
| 6,941,744 | B2* | 9/2005 | Tanaka ............................ 60/277 |
| 2002/0026790 | A1* | 3/2002 | Shimotani et al. .............. 60/285 |
| 2004/0074226 | A1* | 4/2004 | Tanaka ............................ 60/277 |

FOREIGN PATENT DOCUMENTS

| | | | | |
|---|---|---|---|---|
| JP | A 2001-124733 | 5/2001 | | |
| JP | A 2001-355485 | 12/2001 | | |
| JP | B2 3316066 | 8/2002 | | |
| JP | 2002266629 A * | 9/2002 | ................ | F01N 3/20 |
| JP | A 2002-266629 | 9/2002 | | |
| JP | A 2003-293745 | 10/2003 | | |
| JP | B2 3589179 | 11/2004 | | |
| JP | A 2005-54604 | 3/2005 | | |

OTHER PUBLICATIONS

Partial European Search Report issued in European Application No. 08721966.3 dated May 25, 2011.

* cited by examiner

DEGRADATION DIAGNOSTIC APPARATUS FOR NOX CATALYST

TECHNICAL FIELD

The present invention relates to a degradation diagnostic apparatus for a NOx catalyst and in particular, to an apparatus for diagnosing degradation of a NOx storage reduction catalyst arranged in an exhaust passage for an internal combustion engine.

BACKGROUND ART

In general, there is known a NOx catalyst for purifying NOx (nitrogen oxide) contained in an exhaust gas as an exhaust purifying apparatus arranged in an exhaust system for an internal combustion engine such as a diesel engine or a lean burn gasoline engine. Various types of NOx catalysts are known as this type of NOx catalysts, and among them, there is well known a NOx storage reduction (NSR) catalyst for absorbing and removing NOx contained in the exhaust gas. The NOx storage reduction catalyst has an absorption/desorption function of absorbing NOx in the exhaust gas when an air-fuel ratio of an exhaust gas to be supplied is leaner (that is, oxygen excessive atmosphere) than a predetermined value (typically, theoretical air-fuel ratio) and desorbing the absorbed NOx when the air-fuel ratio of the exhaust gas to be supplied is richer (that is, oxygen-lacking atmosphere) than the predetermined value to reduce the NOx to $N_2$.

On the other hand, for example, in a case of an engine boarded on an automobile, on-board diagnosis (OBD) on degradation of a catalyst is required by regulations of various countries for preventing the automobile from running in a state where the exhaust gas is deteriorated. Therefore, there are provided various conventional technologies for diagnosing the degradation in regard to the NOx storage reduction catalyst.

Degradation of the NOx storage reduction catalyst causes reduction in capabilities of absorbing NOx, that is, a NOx amount which the catalyst can absorb. Therefore, as a representative method of detecting degradation of a NOx catalyst, there is provided a method of detecting a NOx absorption capability of the NOx catalyst, which is compared with a predetermined degradation determination value.

In regard to the related technology, for example, Japanese Patent No. 3316066 discloses the technology in which a NOx concentration sensor is arranged downstream of a NOx catalyst and NOx emission amounts based upon an actual NOx concentration of the NOx concentration sensor are integrated for a predetermined time to diagnose presence/absence of a failure of the NOx catalyst with this integral value. In addition, Japanese Patent No. 3589179 discloses the technology in which when reducers are supplied for desorbing NOx from a NOx catalyst (NOx absorber), the extra reducers which are not used for desorbing the NOx are discharged downstream of the NOx catalyst in the form of ammonium, thereby detecting a degradation degree of the NOx catalyst. In this case, an ammonium concentration downstream of the NOx catalyst is detected and also a representative value of an amount of the extra reducers is found from a change of the ammonium concentration, detecting the degradation degree of the NOx catalyst based upon this representative value. The ammonium concentration downstream of the NOx catalyst is detected by a sensor which can detect both of a NOx concentration and an ammonium concentration in the exhaust gas.

Incidentally, under the present circumstance where exhaust gas regulations for automobiles have become tightened, the NOx emission regulation value is made very small and on the other hand, a value of the NOx emission by which the NOx catalyst should be determined to be degraded, that is, an OBD regulation value is also made very small. Particularly, according to U.S. SULEV (Super Ultra Low Emission Vehicle), not only the emission regulation value is tight, but also the OBD regulation value is 1.75 times as tight as the emission regulation value, as compared to Europe STEP IV or the like. That is, a difference in emission level and in catalyst degradation degree from the emission regulation value to the OBD regulation value is small and the small difference is required to be distinguished. Therefore, higher diagnosis precision is required also in regard to degradation diagnosis of the NOx catalyst.

For example, according to the technology described in Japanese Patent No. 3316066, the NOx emission amount is integrated based upon an output value of the NOx concentration sensor downstream of the NOx catalyst to diagnose presence/absence of a failure of the NOx catalyst based upon this integral value. However, the NOx emission amount herein means an emission amount of NOx which is not processed by the NOx catalyst and simply passes through the NOx catalyst (called "passing NOx") as it is and the output value itself of the NOx concentration sensor is minutely small. In general, as an output value of the sensor is smaller, an error rate of the sensor is larger. Therefore, in consideration of the error of the sensor, there is the possibility that a value containing many error amounts is integrated, which is used for failure diagnosis. This technology is not necessarily sufficient in terms of securing high diagnosis precision In addition, according to the technology described in Japanese Patent No. 3589179, the extra amount of the reducers among the reducers supplied to the NOx catalyst is decreased to calculate an amount of the reducers which is necessary and just enough for NOx desorption from the NOx catalyst. When this appropriate amount of the reducers is below a predetermined value, it is determined that the NOx catalyst is degraded by assuming that the NOx absorption capability of the NOx catalyst is sufficiently lowered (refer to paragraphs 0065 to 0068, P9) That is, the technology described in Japanese Patent No. 3589179 is adapted to measure the NOx absorption capability of the NOx catalyst and compare this value with a predetermined degradation determination value.

In this technology, the extra amount of the reducers is used for calculating an appropriate amount of the reducers and the amount of reducers to be supplied is feedback-controlled to be always appropriate regardless of whether the appropriate amount of the reducers are large or small (that is, even if the NOx absorption capability is high or low). In consequence, the extra amount of the reducers is generated relatively frequently without a failure, and an excessive amount of the reducers leads to deterioration of fuel consumption.

DISCLOSURE OF THE INVENTION

The present invention is made in view of the foregoing problems and an object of the present invention is to provide a degradation diagnostic apparatus for a NOx catalyst which can detect degradation of a NOx storage reduction catalyst with high precision and without causing deterioration of fuel consumption.

According to a first aspect of the present invention, there is provided a degradation diagnostic apparatus for a NOx catalyst comprising:

a NOx storage reduction catalyst arranged in an exhaust passage for an internal combustion engine;

rich spike means for performing a rich spike operation supplying a reducer to the NOx catalyst for desorbing the absorbed NOx;

a NOx sensor arranged downstream of the NOx catalyst; and degradation determination means for determining degradation of the NOx catalyst based upon output of the NOx sensor when an amount of the reducers corresponding to a NOx amount which a criteria catalyst as a boundary between degradation and normality can absorb is supplied to the NOx catalyst.

According to the first aspect of the present invention, the degradation of the NOx catalyst is determined based upon the output of the NOx sensor when the amount of the reducers corresponding to the NOx amount which the criteria catalyst can absorb is supplied to the NOx catalyst. In a normal catalyst, even if such reducer amount is supplied, a small NOx sensor output only is acquired, but in contrast, in a degraded catalyst, when such reducer amount is supplied, the NOx sensor output is made large. Use of this characteristic causes degradation of the NOx catalyst to be determined based upon a magnitude of the NOx sensor output alone.

The first aspect of the present invention is different from the technology described in Japanese Patent No. 3316066 in which a minute NOx sensor output value containing many error amounts is integrated to perform degradation diagnosis using an integral value in which the error amount is enlarged, and performs the degradation diagnosis with a relatively large sensor output value. Therefore, higher diagnosis precision can be secured by reducing the influence of the sensor error, making it possible to distinguish a small difference in the catalyst degradation degree. Further, the degradation diagnosis on a vehicle is performed in a direction where the NOx catalyst gradually degrades from a state of a new product (normal state). However, in a case of a normal catalyst, each time the degradation diagnosis is performed, only a NOx amount corresponding to a criteria catalyst which is smaller than the NOx absorption capability of the catalyst itself is absorbed, and only a reducer amount corresponding to the corresponding criteria catalyst is supplied. Therefore, the reducers are not excessively supplied at degradation diagnosis. Only when the catalyst is degraded, the reducers are excessively supplied. In addition, when the catalyst is detected to be degraded, a warning is given to a user, so that the catalyst may be replaced. Accordingly, supply of the excessive reducers at degradation diagnosis can be usually prevented through a life cycle of the catalyst, preventing deterioration of the fuel consumption.

In a second aspect of the present invention according to the first aspect, the NOx sensor can detect ammonium in the exhaust gas.

A third aspect of the present invention according to the first or second aspect is provided with calculating means for calculating a NOx amount supplied to the NOx catalyst, wherein, when the calculating means calculates a supply NOx amount equal to the NOx amount which the criteria catalyst can absorb, the rich spike means supplies an amount of the reducers corresponding to the NOx amount which the criteria catalyst can absorb.

In a fourth aspect of the present invention according to any of the first to third aspects, the degradation determination means determines that the NOx catalyst is degraded when an output value of the NOx sensor is more than a predetermined degradation determination value.

A fifth aspect of the present invention is provided with a degradation diagnostic apparatus for a NOx catalyst comprising:

a NOx storage reduction catalyst arranged in an exhaust passage for an internal combustion engine;

rich spike means for performing a rich spike operation supplying a reducer to the NOx catalyst for desorbing the absorbed NOx a NOx sensor arranged downstream of the NOx catalyst;

calculating means for calculating a NOx amount supplied to the NOx catalyst; and degradation determination means for determining degradation of the NOx catalyst, wherein, when the supply NOx amount calculated by the calculating means reaches a predetermined value, an amount of the reducers corresponding to the supply NOx amount is supplied by the rich spike means, the supply NOx amount and the supply reducer amount are gradually increased to acquire a maximum output value of the NOx sensor at each time, and the degradation determination means determines the degradation of the NOx catalyst based upon a supply NOx amount corresponding to at least one of the acquired NOx sensor maximum output values.

In a sixth aspect of the present invention according to the fifth aspect, the degradation determination means determines the degradation of the NOx catalyst by comparing the minimum value of the supply NOx amounts corresponding to the NOx sensor maximum output values which are more than a predetermined threshold value with a predetermined degradation determination value.

In a seventh aspect of the present invention according to the fifth aspect, the degradation determination means determines a regression line representing a relation with the supply NOx amount in regard to the NOx sensor maximum output value which is more than the predetermined threshold value to determine a supply NOx amount corresponding to the threshold value on the regression line and determines the degradation of the NOx catalyst by comparing the determined supply NOx amount with a predetermined degradation determination value.

In an eighth aspect of the present invention according to the sixth or seventh aspect, the predetermined degradation determination value is a value equal to a NOx amount which can be absorbed by a criteria catalyst as a boundary between degradation and normality.

The present invention can achieve an excellent effect that degradation, of the NOx storage reduction catalyst can be detected with high precision and without causing deterioration of the fuel consumption.

BEST MODE FOR CARRYING OUT THE INVENTION

Hereinafter, the best mode for carrying out the present invention will be explained with reference to the accompanying drawings.

Figure 1:
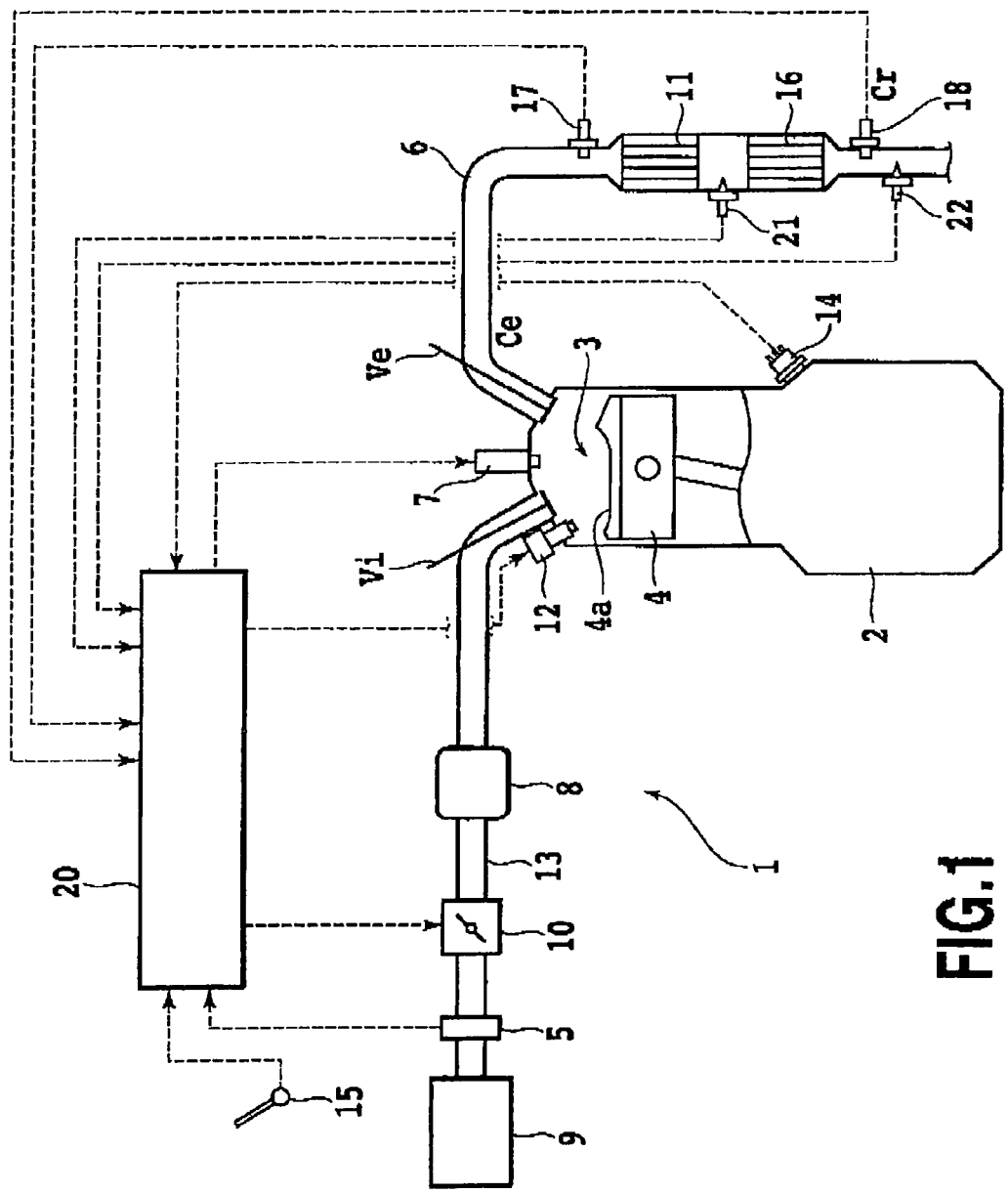
FIG. 1 is a schematic system diagram showing an internal combustion engine according to an embodiment of the present invention.

FIG. 1 is a schematic system diagram for an internal combustion engine according to a first embodiment of the present invention. As shown in the figure, an internal combustion engine 1 burns a mixture of air and fuel in a combustion chamber 3 formed in a cylinder block 2 to reciprocate a piston 4 in the combustion chamber 3, thereby generating power. The internal combustion engine 1 is a multi-cylinder engine for a vehicle (one cylinder only is illustrated), a spark ignition type of internal combustion engine, more specially a gasoline engine. However, the internal combustion engine to which the present invention is applied is not limited to the spark ignition type of internal combustion engine, but may be, for example, a compression ignition type of internal combustion engine, that is, a diesel engine.

In a cylinder head for the internal combustion engine 1, an intake valve Vi opening/closing an intake port and an exhaust valve Ve opening/closing an exhaust port are arranged for each cylinder. Each of the intake valve Vi and the exhaust valve Ve is opened and closed by a cam shaft (not shown). In addition, an ignition plug 7 is attached to a top of the cylinder head at each cylinder for igniting the mixture in the combustion chamber 3. Further, an injector (fuel injection valve) 12 is arranged in the cylinder head at each cylinder to directly inject fuel into the combustion chamber 3. The piston 3 is formed in a deep-dish crown shape, and a recessed portion 4a is formed on a top surface thereof. In the internal combustion engine 1, the fuels directly injected from the injector 12 toward the recessed portion 4a of the piston 4 in a state where air is aspired into the combustion chamber 3. In consequence, a layer of the mixture of the air and the fuel is formed (stratified) in the vicinity of the ignition plug 7 in a state of being separated from the surrounding air layer, thus performing stable stratified combustion.

The intake port of each cylinder is connected to a surge tank 8 as an intake collection chamber through a branch pipe for each cylinder. An intake pipe 13 constituting an intake collection passage is connected to the upstream side of the surge tank 8 and an air cleaner 9 is arranged at the upstream end of the intake pipe 13. Further, an air flow meter 5 for detecting an intake air quantity and an electronically controlled throttle valve 10 are incorporated in the intake pipe 13 in the order from the upstream side. It should be noted that the intake passage is formed of the intake port, the surge tank 8 and the intake pipe 13.

On the other hand, an exhaust port of each cylinder is connected to an exhaust pipe 6 constituting an exhaust collection passage through a branch pipe of each cylinder. The exhaust passage is formed of the exhaust port, the branch pipe and the exhaust pipe 6. A three-way catalyst 11 which can purify CO, HC and NOx in the exhaust gas simultaneously is arranged at the upstream side of the exhaust pipe 6, and a NOx catalyst 16 which can purify NOx in the exhaust gas is arranged at the downstream side of the exhaust pipe 6. The present embodiment uses a CCL catalyst unit (CCL: Catalytic Converter Lean) accommodating the three-way catalyst 11 and the NOx catalyst 16 in the same casing, but, not limited thereto, the three-way catalyst 11 and the NOx catalyst 16 may be individually arranged to be accommodated in separated casings. The three-way catalyst 11 is not necessarily required and may be omitted. For example, in a case of a diesel engine, there are many examples of not providing a three-way catalyst.

An air-fuel ratio sensor 17 is arranged upstream of the three-way catalyst 11 for detecting an air-fuel ratio (A/F) of the exhaust gas. In addition, a NOx sensor for detecting a NOx concentration of the exhaust gas, that is, a post-catalyst NOx sensor 18 is arranged downstream of the NOx catalyst 16. The air-fuel ratio sensor 17 is formed of a so-called wide-range air-fuel ratio sensor and can continuously detect an air-fuel ratio over a relatively wide range, outputting a current signal in proportion to the air-fuel ratio. However, the air-fuel ratio sensor 17 is not limited thereto, but may be formed of a so-called $O_2$ sensor of which an output voltage rapidly changes on the border of a stoichiometric air-fuel ratio.

The post-catalyst NOx sensor 18 outputs a current signal in proportion to a NOx concentration of the exhaust gas. Particularly, the post-catalyst NOx sensor 18 can detect ammonium ($NH_3$) in the exhaust gas and is a so-called critical current NOx sensor. This type of NOx sensor is disclosed in Japanese Patent No. 3589179 or the like. The post-catalyst NOx sensor 18 dissolves NOx (particularly NO) in the exhaust gas into $N_2$ and $O_2$ therein and generates a current output in proportion to an oxygen ion amount by movement of oxygen ions between electrodes based upon the $O_2$. On the other hand, the post-catalyst NOx sensor 18 dissolves $NH_3$ in the exhaust gas into NO and $H_2O$ and further dissolves the NO into $N_2$ and $O_2$, thereafter generating a current output in the same principle as the case of NOx. The post-catalyst NOx sensor 18 produces the output in proportion to a total concentration of NOx concentration and ammonium concentration and can not separately output the NOx concentration and the ammonium concentration.

The ignition plug 7, the throttle valve 10 and the injector 12 which are described above and the like are connected electrically to an electronic control unit (hereinafter, called ECU) 20 as control means. The ECU 20 includes a CPU, a ROM, a RAM, input/output ports, a memory unit and the like. As shown in FIG. 1, the air flow meter 5, the air-fuel ratio sensor 17 and the post-catalyst NOx sensor 18 which are described above and further, a crank angle sensor 14 for detecting a crank angle of the internal combustion engine 1, an accelerator opening sensor 15 for detecting an accelerator opening, exhaust gas temperature sensors arranged upstream/downstream of the NOx catalyst 16, that is, a pre-catalyst exhaust gas temperature sensor 21 and a post-catalyst exhaust gas temperature sensor 22, and other various sensors are connected electrically to the ECU 20 through A/D converters (not shown) or the like. The ECU 20 controls the ignition plug 7, the throttle valve 10, the injector 12 and the like based upon detection values or the like of various sensors so as to acquire a desired output and controls an ignition timing, a fuel injection quantity, a fuel injection timing, a throttle opening and the like. The pre-catalyst exhaust gas temperature sensor 21 is arranged in a position between the three-way catalyst 11 and the NOx catalyst 16. A heater is attached to the post-catalyst NOx sensor 18, and temperature control (heater control) of the post-catalyst NOx sensor 18 is performed by the ECU 20. The output of the crank angle sensor 14 is used also for detecting an engine rotational speed Ne.

The three-way catalyst 11 purifies CO, HC and NOx simultaneously when an air-fuel ration of the exhaust gas flowing into the three-way catalyst 11 is in the vicinity of a theoretical air-fuel ratio (for example, A/F=14.6). The window of the air-fuel ratio in which these three elements can be simultaneously purified with high efficiency is relatively narrow.

Therefore, as one mode of the air-fuel ratio control for efficient function of the three-way catalyst 11, an air-fuel ratio of the mixture is controlled so that an air-fuel ratio of the exhaust gas flowing into the three-way catalyst 11 is in the vicinity of the theoretical air fuel ratio. This control is called stoichiometric control and an operation mode of the engine in the middle of stoichiometric controlling is called a stoichiometric operation. In this stoichiometric control, a target air-fuel ratio is set equal to a theoretical air-fuel ratio and the fuel injection quantity injected from the injector 12, that is, the air-fuel ratio is feedback-controlled so that the air-fuel ratio detected by the air-fuel ratio sensor 17 is equal to the target air-fuel ratio.

On the other hand, in view of reduction in fuel consumption, there is a case where the target air-fuel ratio is set to a value higher than the theoretical air-fuel ratio, that is, a lean value as another mode of the air-fuel ratio control. This is called a lean burn control and an operation mode in the middle of lean burn controlling is called a lean burn operation of the engine. In the lean burn control, as in the case of the stoichiometric control, the fuel injection quantity, that is, the air-fuel ratio is feedback-controlled so that the air-fuel ratio detected by the air-fuel ratio sensor 17 is equal to the target air-fuel ratio. There is a case where in the lean burn control, an air-fuel ratio of the exhaust gas emitted from the engine is made a lean value to the extent that the NOx purification by the three-way catalyst 11 is substantially impossible. In this case, the NOx catalyst 16 is provided downstream of the three-way catalyst 11 for purifying NOx which has passed through the three-way catalyst 11 without being purified.

A NOx storage reduction catalyst is used as the NOx catalyst 16. The NOx storage reduction catalyst 16 is constructed in such a manner that noble metals such as platinum Pt as a catalyst component and NOx absorption components are carried on a substrate surface made of oxide such as aluminum $Al_2O_3$. The NOx absorption component is formed of at least one selected from alkali metals such as kalium K, natrium Na, lithium Li and cesium Cs, alkaline earth elements such as barium Ba and calcium Ca, and rare earth such as lanthanum La and yttrium Y.

The NOx storage reduction catalyst 16 performs an absorption/desorption function of absorbing NOx in the exhaust gas in the form of nitrate salt when an air-fuel ratio of the exhaust gas flowing into the NOx storage reduction catalyst 16 is leaner than a theoretical air-fuel ratio and of desorbing the absorbed NOx when the air-fuel ratio of the exhaust gas flowing into the NOx storage reduction catalyst 16 is equal to or richer than the theoretical air-fuel ratio. During lean burn operating, the exhaust air-fuel ratio is leaner than the theoretical air-fuel ratio and the NOx catalyst 16 performs absorption of NOx in the exhaust gas. On the other hand, when the NOx catalyst 16 absorbs NOx to the extent of being saturated, that is, being completely filled, the NOx catalyst 16 can not absorb the NOx more than that. Therefore, for desorbing the absorbed NOx from the NOx catalyst, a rich spike operation supplying a reducer to the NOx catalyst 16 is performed. It should be noted that recovery of NOx absorption capability of the NOx catalyst 16 by desorbing the absorbed NOx from the NOx catalyst 16 is called NOx regeneration. The NOx desorbed from the NOx catalyst is reduced in reaction to the surrounding reducers (for example, $H_2$ and CO) to form $N_2$, which is discharged downstream of the catalyst.

The rich spike operation is realized by the following rich spike control in the present embodiment. That is, the target air-fuel ratio is temporarily set equal to or richer than the theoretical air-fuel ratio, and the air-fuel ration of the mixture, that is, the exhaust gas is equal to or smaller than the theoretical air-fuel ratio. A difference between the actual air-fuel ratio of the exhaust gas and the theoretical air-fuel ratio corresponds to an instantaneous amount of the reducers.

In regard to the rich spike operation, various methods other than that exist. For example, there is a method in which a reducer supply valve is separately provided upstream of the NOx catalyst and the reducer supply valve is controlled for the opening to supply the reducer into the exhaust gas. Alternatively, so-called post injection is possible in which the fuel is injected from the injector 12 into the combustion chamber 3 during the latter half of an expansion stroke or during an exhaust stroke to make a great number of unburned fuel be contained in the exhaust gas.

In a case of supplying reducers to the NOx catalyst 16 by the rich spike operation, the reducer (for example, $H_2$ and CO) reacts to $N_2$ in the exhaust gas in the NOx catalyst 16 to generate ammonium $NH_3$. In addition, the ammonium $NH_3$ reacts to NOx desorbed from the NOx catalyst 16 and as a result, the NOx is reduced to form $N_2$. On the other hand, when an excessive amount of the reducers are supplied, the NOx absorbed in the NOx catalyst 16 is all desorbed and reduced, but ammonium $NH_3$ is generated from the reducers ($H_2$ and CO) which are not used for desorption and reduction of the NOx, and discharged downstream of the NOx catalyst 16.

The NOx absorption/desorption function of the NOx catalyst 16 can not be substantially performed when the NOx catalyst 16 is not within a predetermined operation temperature region. Therefore, in the present embodiment, a temperature of the NOx catalyst 16 (catalyst floor temperature) is detected or estimated. The temperature of the NOx catalyst 16 may be directly detected by a temperature sensor buried in the NOx catalyst, but in the present embodiment, it is estimated. More specially, the ECU 20 estimates a catalyst temperature based upon a pre-catalyst exhaust gas temperature and a post-catalyst exhaust gas temperature detected respectively by the pre-catalyst exhaust gas temperature sensor 21 and the post-catalyst exhaust gas temperature sensor 22. It should be noted that the estimation method is not limited to this example.

Next, the degradation diagnosis of the NOx catalyst 16 will be explained.

On the whole, the feature of the first embodiment in regard to the degradation diagnosis to be described here is in a point where an amount of reducers corresponding to a NOx amount which a criteria catalyst as a boundary between degradation and normality can absorb is supplied to the NOx catalyst 16 and the degradation of the NOx catalyst 16 is determined based upon the output of the post-catalyst NOx sensor 18 at this point.

Here, when description is made to "criteria catalyst", as the NOx catalyst is degraded, a NOx amount capable of being absorbed, that is, a NOx absorption capability is deteriorated. At a point where the NOx amount capable of being absorbed is decreased below a predetermined value (typically, equivalent to an OBD regulation value mentioned above), it is required to determine that the NOx catalyst is degraded. The NOx catalyst having the NOx absorption capability equal to this predetermined value is a criteria catalyst. It is required to determine that the NOx catalyst having the NOx absorption capability equal to or higher than the criteria catalyst is normal and in contrast, it is required to determine that the NOx catalyst having the NOx absorption capability lower than the criteria catalyst is degraded.

The NOx amount which such criteria catalyst can absorb (called criteria catalyst NOx amount) is in advance found by a production version test. In addition, a reducer amount in accordance with the criteria NOx amount (called criteria reducer amount), that is, a reducer amount necessary and just enough for desorbing and reducing the NOx of the criteria NOx amount absorbed by the NOx catalyst is also in advance found by a production version test or the like.

In a case where the NOx catalyst 16 absorbs NOx more than the criteria NOx amount and the criteria reducer amount is supplied to the NOx catalyst 16 by the rich spike operation, the reducer amount is lacking or appropriate, so that ammonium generated from the extra reducers is not discharged downstream of the NOx catalyst. Therefore, the ammonium is not detected downstream of the NOx catalyst 16 by the post-catalyst NOx sensor 18, and it is possible to determine that the NOx catalyst 16 is normal for this phenomenon.

On the other hand, when the NOx catalyst 16 can not absorb NOx of the criteria NOx amount and absorbs only the NOx smaller than the criteria NOx amount for the filled state, even if the criteria reducer amount is supplied to the NOx catalyst 16, the reducer amount becomes excessive and the ammonium generated by the extra reducers is discharged downstream of the NOx catalyst 16. In consequence, it is possible to determine that the NOx catalyst 16 is degraded by detecting this ammonium with the post-catalyst NOx sensor 18.

Figure 2:
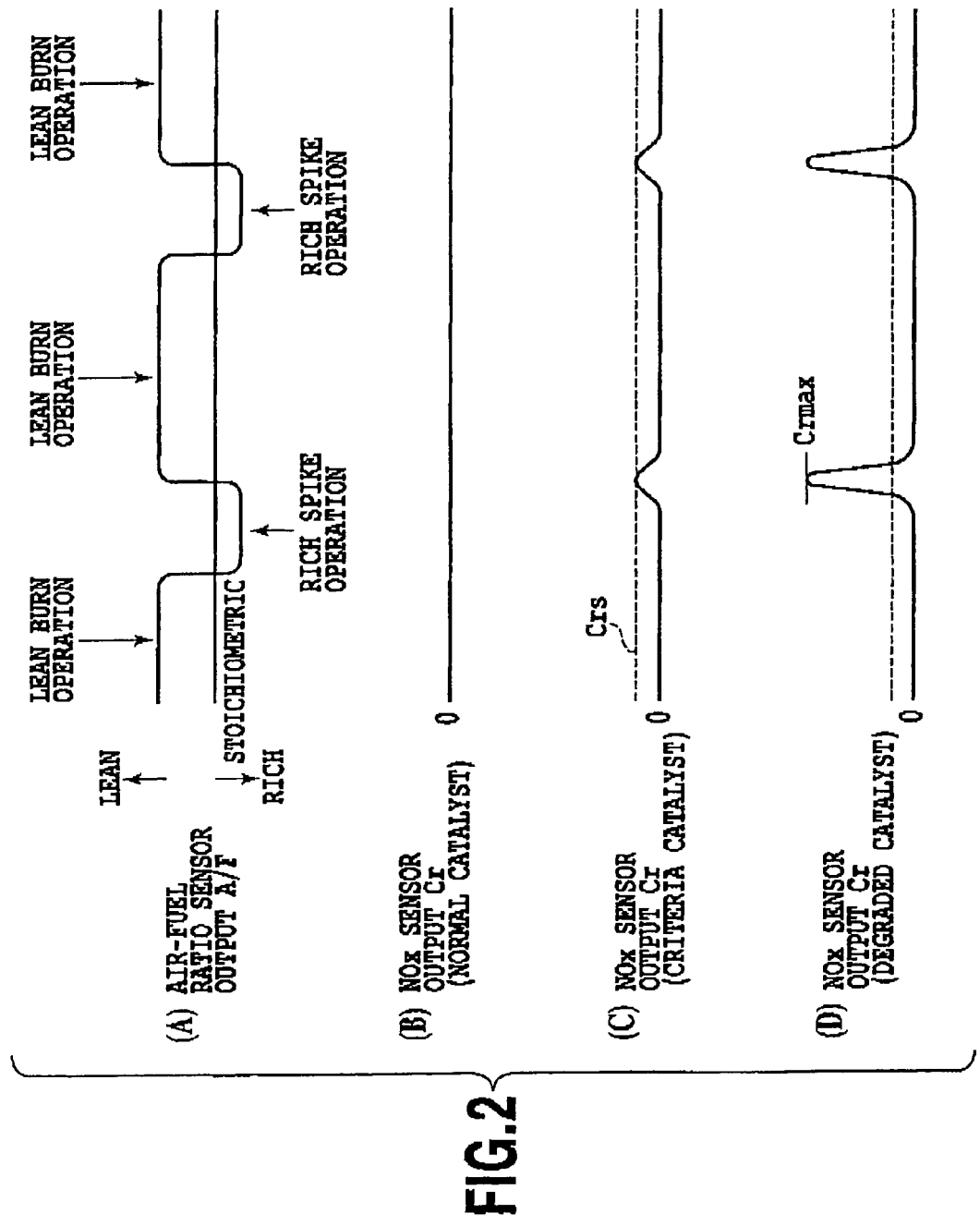
FIG. 2 is a diagram showing a state of an output change of a post-catalyst NOx sensor when a lean burn operation and a rich spike operation are repeated alternately.

FIG. 2 shows a state of an output change of the post-catalyst NOx sensor 18 when the lean burn operation and the rich spike operation are repeated alternately. (A) shows output of the air-fuel ratio sensor 17 (conversion value to air-fuel ratio A/F) and shows an air-fuel ratio of the exhaust gas supplied to the NOx catalyst 16. (B) shows output of the post-catalyst NOx sensor 18 (conversion value to NOx concentration Cr, the same hereinafter) when the NOx catalyst 16 is a normal catalyst, (C) shows output of the post-catalyst NOx sensor 18 when the NOx catalyst 16 is a criteria catalyst, and (D) shows output of the post-catalyst NOx sensor 18 when the NOx catalyst 16 is a degraded catalyst. Here, at lean burn operating, NOx of the criteria NOx amount is designed to be supplied to the NOx catalyst 16 and at rich spike operating, the reducers of the criteria reducer amount are designed to be supplied to the NOx catalyst 16.

As shown in (B), in a case where the NOx catalyst 16 is a normal catalyst, an output value of the post-catalyst NOx sensor 18 is always in the vicinity of zero, and the NOx and the ammonium both are not detected. This is because at lean burn operating, the NOx in the exhaust gas is absorbed in the NOx catalyst 16 and at rich spike operating, the reducers just enough for the absorbed NOx amount are supplied, thereby not generating the extra ammonium.

On the other hand, as the NOx catalyst 16 is degraded, the maximum output value (peak value) Crmax of the post-catalyst NOx sensor 18 around the rich spike operation completion timing becomes gradually large in response to this degradation degree. It is considered that the reason for a rise of the maximum output value Cr max of the post-catalyst NOx sensor 18 is that the discharge amount of the extra ammonium is gradually increased. Therefore, for using this characteristic, the post-catalyst NOx sensor maximum output value in the criteria catalyst is in advance acquired by a production version test or the like. This maximum output value is set as a degradation determination value Crs to compare the actually detected post-catalyst NOx sensor maximum output value Crmax with the degradation determination value Crs. When the post-catalyst NOx sensor maximum output value Crmax is less than the degradation determination value Crs, it is determined that the NOx catalyst 16 is normal, and when the post-catalyst NOx sensor maximum output value Crmax is equal to or more than the degradation determination value Crs, it is determined that the NOx catalyst 16 is degraded.

On the other hand, in addition to the method of comparing the post-catalyst NOx sensor maximum output value Cr max with the degradation determination value Crs, there is alternatively a method of comparing an output value Cr itself of the post-catalyst NOx sensor with the degradation determination value Crs. That is, it is determined that the NOx catalyst 16 is degraded when an output value Cr of the post-catalyst NOx sensor is equal to or more than the degradation determination value Crs at a point before the output value Cr of the post-catalyst NOx sensor reaches to the maximum output value Crmax.

According to the method of the NOx catalyst degradation diagnosis, the degradation of the NOx catalyst 16 can be determined based upon a magnitude of the post-catalyst NOx sensor output value Cr only. More specially, the degradation of the NOx catalyst 16 can be determined by comparing the post-catalyst NOx sensor output value Cr with the predetermined degradation determination value Crs. That is, the present method is different from the method where the minute NOx sensor output value containing many error amounts originally is further integrated and the degradation diagnosis is performed by using the integral value in which the error amounts are increased, as in the case of the technology described in Japanese Patent No. 3316066. The present method performs the degradation diagnosis with a relatively large sensor output value. Therefore, the present method can reduce the influence of the sensor error to secure a high diagnosis precision. In addition, it is possible to distinguish a small difference in catalyst degradation degree.

Further, the on-board degradation diagnosis is performed in a direction where the NOx catalyst is gradually degraded from a new product state, but at each time of the degradation diagnosis, supply of the criteria NOx amount and supply of the criteria reducer amount alone are made. At least until the NOx catalyst reaches to the criteria state, the NOx amount and the reducer amount alone smaller than the capability of the NOx catalyst are supplied to the NOx catalyst. Therefore, the extra ammonium is not discharged at degradation diagnosis. It is not until the NOx catalyst is degraded over the criteria state that the reducers are excessively supplied to generate the extra ammonium. However, if it is detected that the NOx catalyst is degraded, a warning is supposed to be given to a user to replace the catalyst. In consequence, supply of an extra mount of the reducers can be usually prevented at degradation diagnosis through a life cycle of the catalyst to prevent deterioration of fuel consumption.

Next, a special example of the NOx catalyst degradation diagnosis will be explained with reference to FIG. 3.

Figure 3:
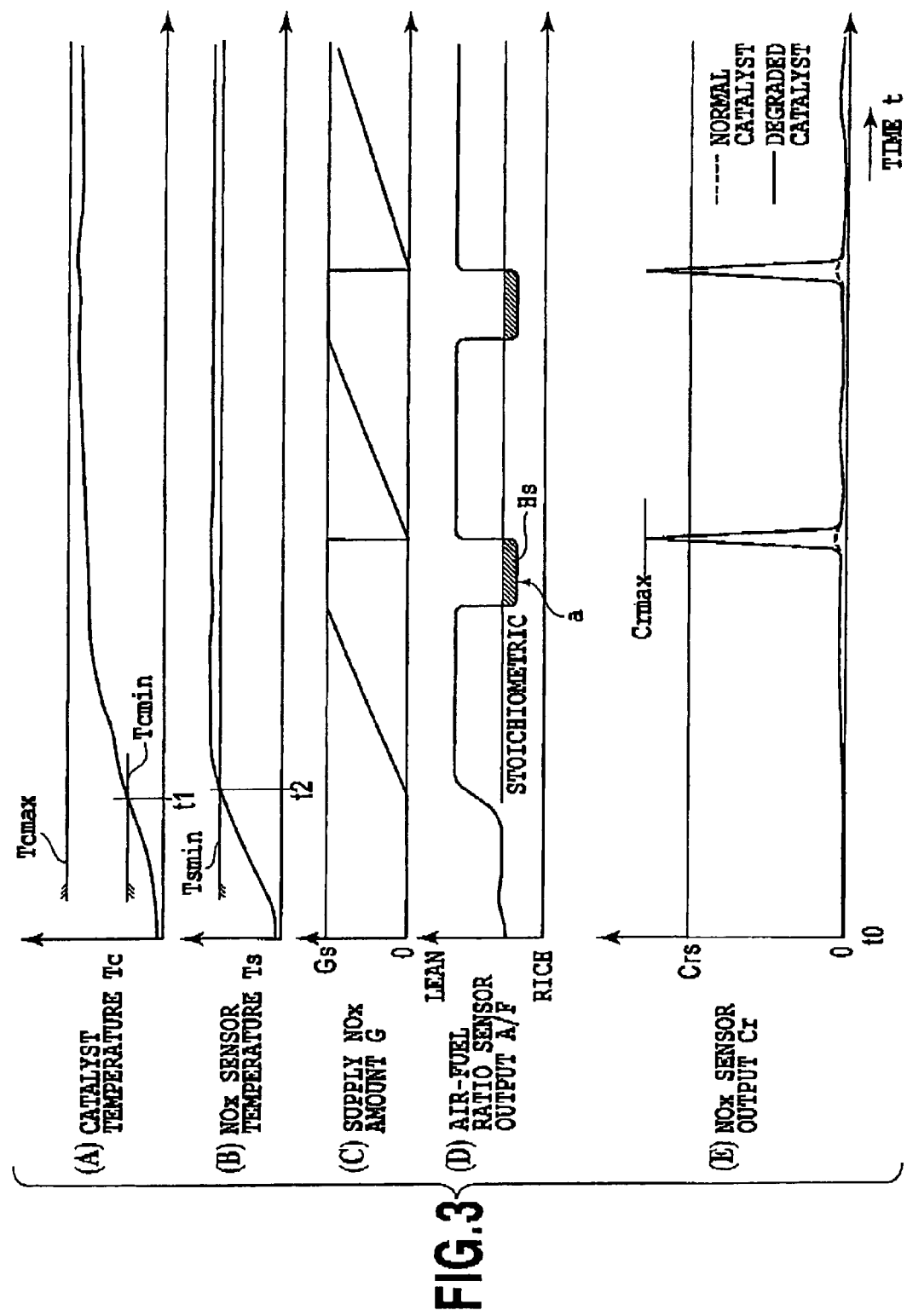
FIG. 3 is a time chart explaining a special example of a first embodiment for NOx catalyst degradation diagnosis.

FIG. 3 shows a change of each value after engine starting. (A) shows a catalyst temperature Tc estimated by the ECU 20, (B) shows a temperature Ts of the post-catalyst NOx sensor 18 (hereinafter, also simply called sensor temperature), (C) shows a supply NOx amount G, (D) shows output of the air-fuel ratio sensor 17 (conversion value to air-fuel ratio A/F) and (E) shows output of the post-catalyst NOx sensor 18 (conversion value to NOx concentration Cr). Time t0 shows engine start completion time. In regard to (B), a temperature Ts of the post-catalyst NOx sensor 18 is detected and controlled by the ECU 20. More specially, an element impedance of the post-catalyst NOx sensor 18 is detected by the ECU 20 and a heater of the post-catalyst NOx sensor 18 is controlled so that the element impedance makes a predetermined value equivalent to a value at sensor activating.

As shown in (A) and (B), when the engine is started, the catalyst temperature Tc and the sensor temperature Ts gradually increase. Thereafter, the catalyst temperature Tc enters into an operation temperature region over a lower limit temperature Tcmin (for example, about 300° C.) (time t1), and the sensor temperature Ts enters into an active temperature region over a lower limit temperature Tsmin (for example, about 750° C.) (time t2). Thereafter, the sensor temperature Ts is maintained to a value slightly higher than the lower limit temperature Tsmin. The upper limit temperature Tcmax of the catalyst operation temperature region is, for example, about 550° C.

As shown in (D), the air-fuel ratio control is shifted from stoichiometric control to lean burn control near time t1 or t2 to maintain the air-fuel ratio to be a value (for example, the order of 16 to 18) higher than the theoretical air-fuel ratio. The air-fuel ratio at this point is an air-fuel ratio as high as to be incapable of purifying NOx by the three-way catalyst 11. Therefore, the NOx emitted from the engine passes through the three-way catalyst 11 without being purified and is trapped and absorbed by the NOx catalyst 16 at the latter stage. In consequence, as shown in (E), the NOx is not detected downstream of the NOx catalyst 16.

On the other hand, as shown in (C), the NOx amount supplied to the NOx catalyst 16 during lean burn operating is sequentially integrated to calculate the supply NOx amount G. More specially, in one calculation cycle, the NOx concentration (called pre-catalyst estimation NOx concentration) Ce in the exhaust gas discharged from the engine 10 is estimated based upon an operating condition of the engine 10. The post-catalyst estimation NOx concentration Ce is multiplied by a value of an intake air quantity Ga as a replacement value of the exhaust gas amount to resultantly calculate a supply NOx amount dG as an instantaneous value. In addition, the supply NOx amount dG as the instantaneous value is integrated for each calculation cycle to calculate the supply NOx amount G. The post-catalyst estimation NOx concentration Ce is calculated according to a predetermined map or the like, based upon, for example, a load rate found from detection values of an engine rotational speed Ne and an intake air quantity Ga (=Ga/Ne) and an air-fuel ratio A/F detected by the air-fuel ratio sensor 17. In place of the post-catalyst NOx concentration, a detection value of a NOx sensor provided upstream of the NOx catalyst 16, that is, a detection value of a pre-catalyst NOx sensor (not shown) (called pre-catalyst detection NOx concentration) may be directly used.

When the lean burn operation continues to be performed, the supply NOx amount G gradually increases. As soon as the supply NOx amount G reaches to the preset criteria NOx amount Gs (for example, 200 mg), the rich spike operation is performed as shown with a code a in (D) for desorbing and reducing the absorbed NOx. More specially, the air-fuel ratio of the mixture, that is, the exhaust gas is controlled to a rich value lower than the theoretical air-fuel ratio. The air-fuel ratio at this point is an air-fuel ratio as low as to be incapable of purifying reduction components such as HC and CO (particularly, HC) by the three-way catalyst 11. In consequence, the reduction component emitted from the engine passes through the three-way catalyst 11 without being purified and is supplied to the NOx catalyst 16 at the latter stage. A value of the supply NOx amount G is held to the criteria NOx amount Gs until the next lean burn operation starts and is reset to zero at the same time as the next lean burn operation starts.

An amount of the reduction components supplied at a rich spike operation, that is, a reducer amount can be calculated as follows, for example. First, a reducer amount dH as an instantaneous value in one calculation cycle is calculated according to the following expression.

$$dH = (1/(A/F) - 1/14.6) \times Ga$$

A/F is an actual air-fuel ratio detected by the air fuel ratio sensor 17, 14.6 is a stoichiometric air-fuel ratio in the present embodiment and Ga is an intake air quantity detected by the air flow meter 5. In addition, the reducer amount dH as the instantaneous value is integrated at each calculation cycle to calculate the reducer amount H supplied from a point of the rich spike operation start to some point.

When the reducer amount H sequentially calculated thus reaches to the criteria NOx amount Hs in accordance with the criteria NOx amount Gs, the rich spike operation is completed. An area of a region hatched in (D) represents the criteria reducer amount Hs.

As shown in (E), except for the vicinity of completion time in the rich spike operation, the output value Cr of the post-catalyst NOx sensor 18 is nearly zero. The reason for it is that during lean burn operating, the NOx supplied to the NOx catalyst 16 is absorbed in the NOx catalyst 16 and during rich spike operating, the NOx desorbed from the NOx catalyst 16 is reduced by the reducer except for the vicinity of completion time in the rich spike operation and emission of the NOx and emission of the ammonium both are not made. On the other hand, in the vicinity of the completion time in the rich spike operation, the post-catalyst NOx sensor output value Cr slightly increases at a normal catalyst (shown by a broken line), but at a degraded catalyst (shown by a solid line), the post-catalyst NOx sensor output value Cr remarkably increases. The reason the post-catalyst NOx sensor output value Cr remarkably increases is that the NOx of the criteria NOx amount Gs is supplied to the NOx catalyst 16 during lean burn operating, but the total amount is not absorbed and the extra amount of the reducers is discharged downstream of the catalyst in the form of ammonium and the ammonium is detected by the post-catalyst NOx sensor 18.

Therefore, it is determined whether the NOx catalyst 16 is degraded or normal based upon whether the post-catalyst NOx sensor output value Cr, preferably the posy-catalyst NOx sensor maximum output value Crmax is larger or smaller than the degradation determination value Crs corresponding to the criteria catalyst.

According to the illustrated example, the above processes are repeated to perform plural times of degradation detections. This allows precision and reliability of the degradation diagnosis to be improved.

Particularly, in a case of the degraded catalyst, the reason that the post-catalyst NOx sensor output value Cr increases in the vicinity of the completion time in the rich spike operation is considered as follows. This is because the absorbed NOx is desorbed from the NOx catalyst by supply of the reducers, but the desorbed NOx does not sufficiently react to the reducer because of reduction degradation of an active point of the catalyst, the desorbed NOx is discharged downstream of the catalyst without reaction (called discharged NOx), and the discharged NOx is detected by the post-catalyst NOx sensor 18. The post-catalyst NOx sensor 18 can not distinguish NOx over ammonium and therefore, the output value thereof increases by the discharged NOx. However, from a point of view of various study results, it is reasonable to consider that the post-catalyst NOx sensor output value in the vicinity of the completion time in the rich spike operation reflects the extra ammonium amount rather than the discharged NOx. In addition, regardless of whether the detected element is the discharged NOx or the extra ammonium, a change of the NOx sensor output value relating to the catalyst degradation degree is a value as acquired by a production version test described above. In consequence, it is possible to preferably perform the degradation diagnosis with aforementioned method without distinction of the discharged NOx and the ammonium.

Figure 4:
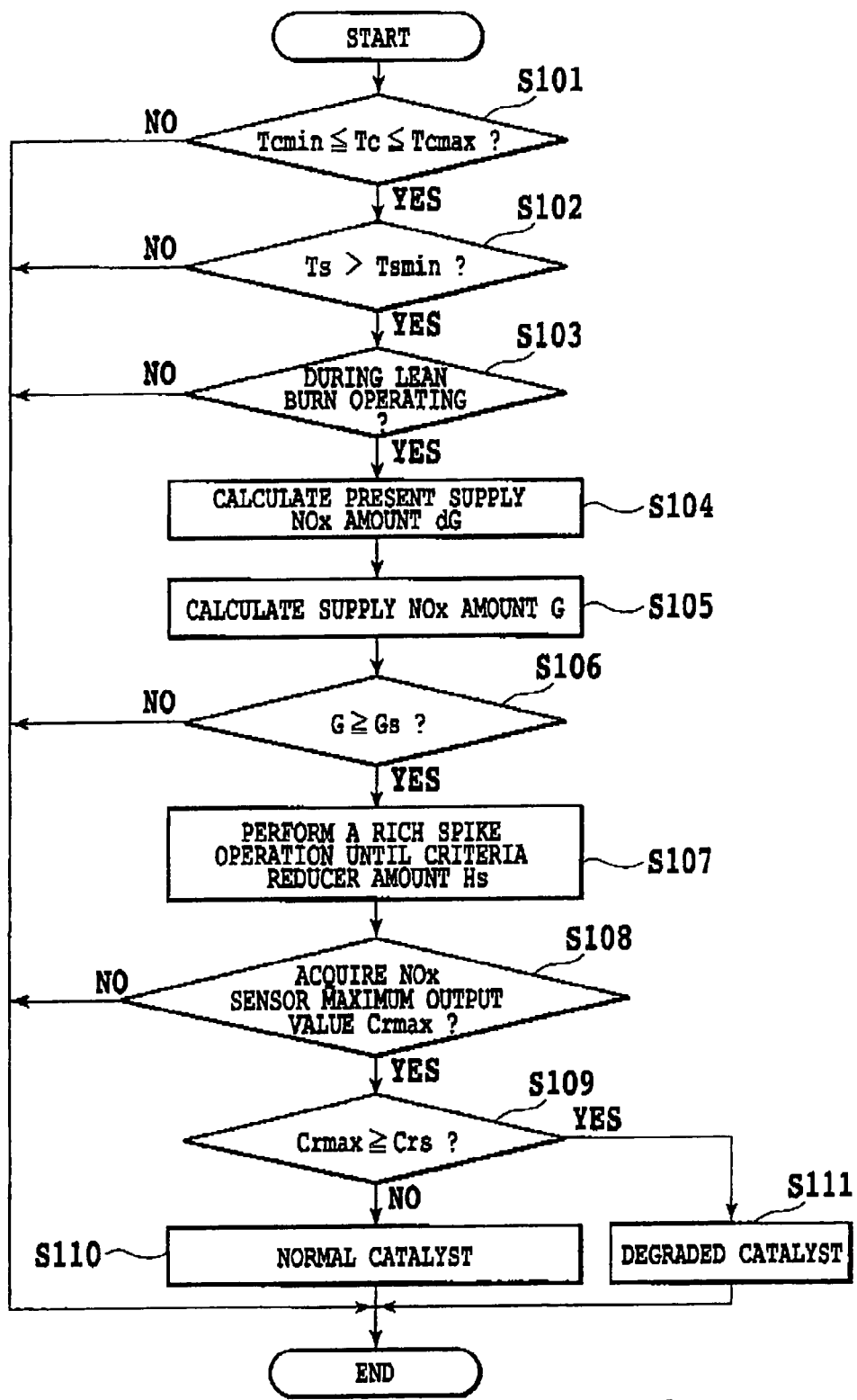
FIG. 4 is a flow chart showing the process contents of the first embodiment.

Next, a special processing for performing the degradation diagnosis explained here will be explained with reference to FIG. 4. The processing illustrated is repeatedly executed in each predetermined calculation cycle by the ECU 20.

At first step S101, it is determined whether or not an estimation catalyst temperature Tc is within the aforementioned operation temperature region, that is, whether or not the estimation catalyst temperature Tc is more than a lower limit temperature Tcmin and less than an upper limit temperature Tcmax.

When the catalyst temperature Tc is not within the operation temperature region, the present processing ends. In this case, the catalyst temperature may be controlled so that the catalyst temperature Tc is within the operation temperature region. For example, by changing the air-fuel ratio to a richer side, the catalyst temperature Tc increases and by changing the air-fuel ratio to a leaner side, the catalyst temperature Tc decreases.

On the other hand, when the catalyst temperature Tc is within the operation temperature region, at step S102 it is determined whether or not the post-catalyst NOx sensor 18 is in an active state, that is, whether or not a temperature Ts of the post-catalyst NOx sensor 18 is higher than the lower limit temperature Tsmin of the active temperature region.

When the post-catalyst NOx sensor 18 is not in the active state, the present processing ends. When the post-catalyst NOx sensor 18 is in the active state, at step S103 it is determined whether or not the engine is during lean burn operating. More specially, it is determined whether or not the air-fuel ratio A/F detected by the air-fuel ratio sensor 17 is larger than a predetermined lean air-fuel ratio.

When the engine is not during lean burn operating, the present processing ends. On the other hand, when the engine is during lean burn operating, at step S104 the present NOx amount dG is calculated as described above and at step S105, the supply NOx amount G is integrated as describe above.

At next step S106, it is determined whether or not the supply NOx amount G has reached to a predetermined criteria NOx amount Gs, more specially whether or not the supply NOx amount G is more than the criteria NOx amount Gs. When the supply NOx amount G has not reached to the criteria NOx amount Gs, the present processing ends and when the supply NOx amount G has reached to the criteria NOx amount Gs, the process goes to step S107.

At step S107, the rich spike operation is performed. This rich spike operation, as described above, continues to be performed until the reducer amount H as an integral value reaches to a predetermined criteria reducer amount Hs.

Next, at step S108, it is determined whether or not the post-catalyst NOx sensor maximum output value Crmax is acquired. When the post-catalyst NOx sensor maximum output value Crmax is not acquired, the present processing ends. On the other hand, when the post-catalyst NOx sensor maximum output value Crmax is acquired, at step S109 the post-catalyst NOx sensor maximum output value Crmax is compared with a predetermined degradation determination value Crs corresponding to the criteria.

When the post-catalyst NOx sensor maximum output value Crmax is smaller than the degradation determination value Crs, at step S110 it is determined that the NOx catalyst 16 is normal. On the other hand, when the post-catalyst NOx sensor maximum output value Crmax is more than the degradation determination value Crs, at step S111 it is determined that the NOx catalyst 16 is degraded. As a result, the present processing ends.

Next, a second embodiment of the NOx catalyst degradation diagnosis will be explained.

On the whole, in the second embodiment, when a NOx amount supplied to the NOx catalyst 16 has reached to a predetermined value, an amount of the reducers in accordance with the supply NOx amount is supplied. In addition, the supply NOx amount and the supply reducer amount are increased in stages and the maximum output value of the post-catalyst NOx sensor 18 is acquired at each time. The degradation of the NOx catalyst is determined based upon the supply NOx amount corresponding to at least one of the acquired post-catalyst NOx sensor maximum output values.

Figure 5:
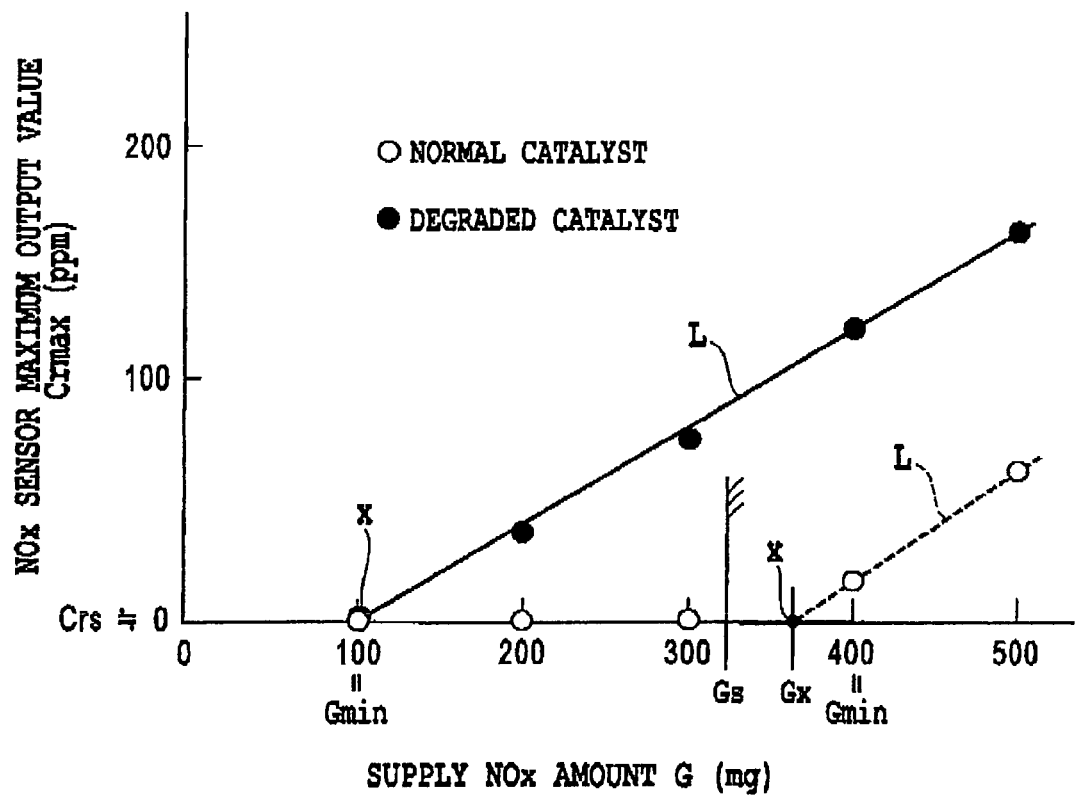
FIG. 5 is a graph explaining a second embodiment of the NOx catalyst degradation diagnosis.

This method will be more specially explained with reference to FIG. 5. FIG. 5 is the test result showing a relation between a NOx amount supplied to the NOx catalyst 16, that is, a supply NOx amount G (mg) and a post-catalyst NOx sensor maximum output value Crmax (ppm) acquired when an amount of the reducers corresponding to and just enough for the supply NOx amount is supplied to the NOx catalyst 16. A while circle shows a case of a normal catalyst and a black circle shows a case of a degraded catalyst.

As shown in FIG. 5, in a case of the normal catalyst, even if a supply NOx amount G to the NOx catalyst 16 is increased in the order of 100 mg, 200 mg, and 300 mg, the post-catalyst NOx sensor maximum output value is nearly zero. The reason for it is that when a NOx amount capable of being absorbed by the normal catalyst is larger than 300 mg and an amount of the NOx smaller than 300 mg is supplied, the total amount is absorbed by the NOx catalyst and when a reducer amount in accordance with the supply NOx amount is supplied, the total reducer amount is used for reduction of the absorbed NOx completely.

On the other hand, in a case of increasing the supply NOx amount G to 400 mg, the post-catalyst NOx sensor maximum output value Crmax is larger than zero. When the supply NOx amount G is further increased to 500 mg, a further large post-catalyst NOx sensor maximum output value can be acquired. This is because a NOx amount capable of being absorbed by the NOx catalyst is smaller than 400 mg and therefore, even if an amount of the NOx larger than 400 mg is supplied, the total amount can not be absorbed. Further, even when a reducer amount in accordance with the supply NOx amount is supplied, the total reducer amount is not used for reduction of the absorbed NOx, the reducer amount is excessive and the extra ammonium is detected by the post-catalyst NOx sensor 18. Since the NOx catalyst absorbs a constant amount of the NOx only smaller than 400 mg, if the reducer amount is increased from about 400 mg, the extra reducer amount increases and the post-catalyst NOx sensor maximum output value Crmax increases.

From this tendency, it is found that the NOx amount capable of being absorbed by the normal catalyst in the illustrated example is larger than 300 mg and smaller than 400 mg.

On the other hand, in a case of the degraded catalyst, only when the supply NOx amount G is 100 mg, the post-catalyst NOx sensor maximum output value Crmax is generally zero and as the supply NOx amount G is increased in the order of 200 mg, 300 mg, 400 mg and 500 mg, the post-catalyst NOx sensor maximum output value Crmax increases proportionally. From this tendency, it is found that the NOx amount capable of being absorbed by the degraded catalyst in the illustrated example is larger than 100 mg and smaller than 200 mg.

Therefore, the degradation diagnosis of the NOx catalyst is performed by using this relation. More specially, as the first embodiment, the NOx amount capable of being absorbed by the criteria catalyst is in advance acquired by a production version test or the like and such criteria NOx amount is set as a degradation determination value Gs. In addition, the NOx amount G supplied to the NOx catalyst 16 is in stages increased from a value smaller than the degradation determination value GS to a value larger than that. Each time the reducer amount H in accordance with each supply NOx amount G is supplied, the post-catalyst NOx sensor maximum output value Crmax is acquired at each time. Among them, sample points (sample data shown in white or black circles in the figure) where the post-catalyst NOx sensor maximum output value Crmax exceeds a predetermined value Crs corresponding to the criteria (here, it is a value slightly larger than zero, but may be considered as zero for convenience) are acquired and the minimum value Gmin among the supply NOx amounts G corresponding to the sample points is compared with the degradation determination value Gs. When the supply NOx amount minimum value Gmin is more than the degradation determination value Gs, it is determined that the NOx catalyst is normal and when the supply NOx amount minimum value Gmin is less than the degradation determination value Gs, it is determined that the NOx catalyst is degraded.

In the example shown in FIG. 5, the degradation determination value Gs is set as 320 mg. In a case of the normal catalyst, the sample points where the post-catalyst NOx sensor maximum output value Crmax exceeds the predetermined value Crs are sample points where G=400 mg and G=500 mg. The minimum value Gmin among the supply NOx amounts corresponding to these samples is 400 mg. Since 400 mg >320 mg, it is determined that the NOx catalyst is normal. On the other hand, in a case of the degraded catalyst, the sample points where the post-catalyst NOx sensor maximum output value Crmax exceeds the predetermined value Crs are sample points where G=200 mg, 300 mg, 400 mg or 500 mg. The minimum value Gmin among the supply NOx amounts corresponding to these samples is 200 mg. Since 200 mg <320 mg, it is determined that the NOx catalyst is degraded.

According to the first embodiment, since the minimum value Gmin of the supply NOx amount as a comparison object to the degradation determination value Gs is acquired for each 100 mg in stages only, the first embodiment is simple, but it slightly lacks the precision. Therefore, the second embodiment to be described below adopts a method with more precision.

That is, referring to FIG. 5, in regard to sample points where the post-catalyst NOx sensor maximum output value Crmax exceeds a predetermined value Crs, regression lines L representing a relation between post-catalyst NOx sensor maximum output value Crmax and supply NOx amount G are determined. The regression line L makes a line with a constant inclination as shown in FIG. 5. In addition, a point on the regression line L where the post-catalyst NOx sensor maximum output value Crmax comes to the predetermined value Crs, that is, a determined point x is determined and also the supply NOx amount Gx corresponding to the determined point x is acquired. When the acquired supply NOx amount Gx is compared with the degradation determination value Gs. When the acquired supply NOx amount Gx is more than the degradation determination value Gs, it is determined that the NOx catalyst is normal and when the acquired supply NOx amount Gx is less than the degradation determination value Gs, it is determined that the NOx catalyst is degraded.

Figure 6:
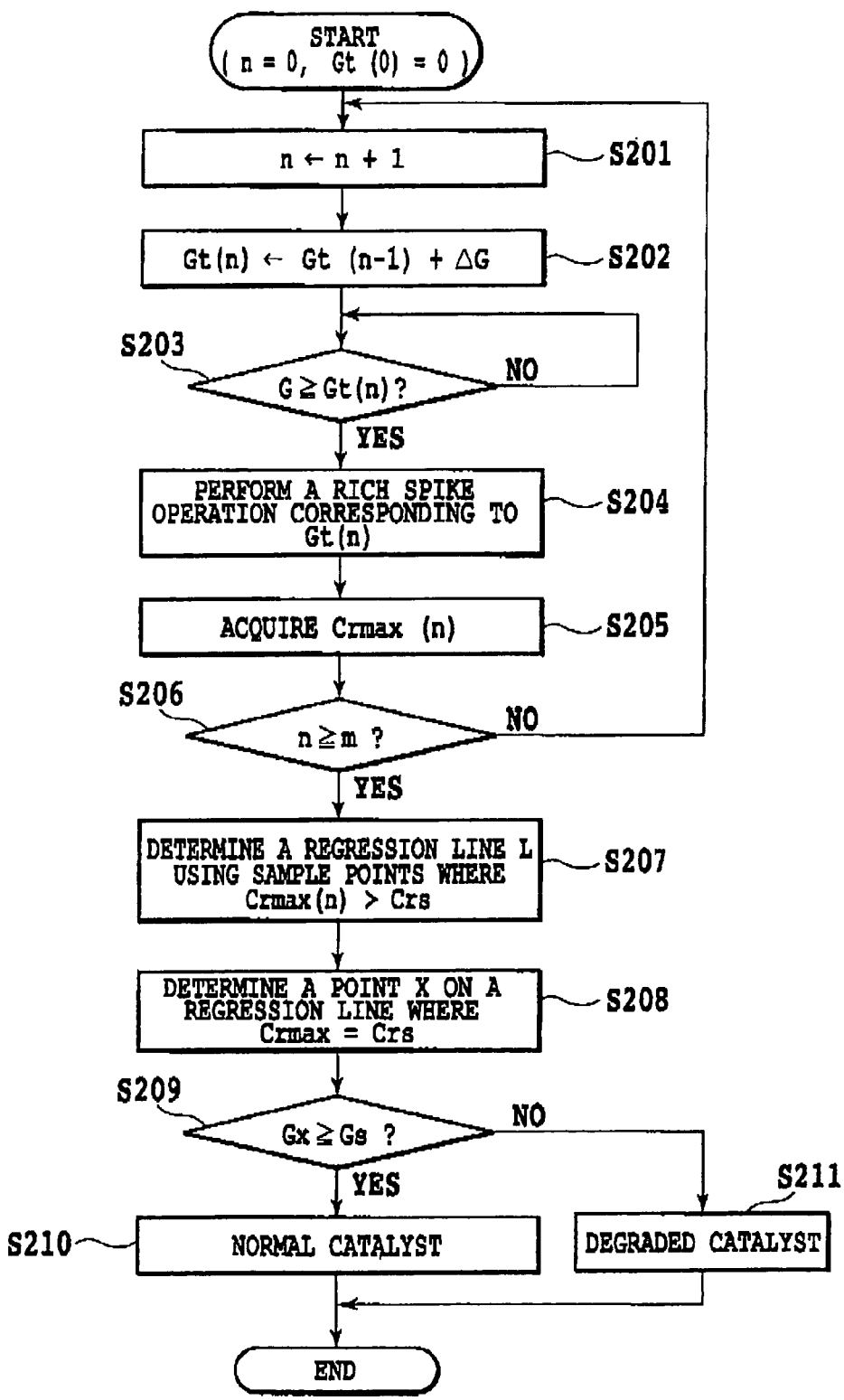
FIG. 6 is a flow chart explaining the process contents of the second embodiment.

According to the second embodiment, the supply NOx amount Gx as a comparison object to the degradation determination value Gs is acquired not for each 100 mg, but sequentially, and therefore, the second embodiment can acquire higher precision than the first embodiment. Hereinafter, a special processing performed by the ECU 20 in the second embodiment will be explained with reference to FIG. 6.

As a premise of the present processing, an initial value of the number n of acquisition times of the post-catalyst NOx sensor maximum output value Crmax is defined as 0 and an initial value (Gt (0)) of a target value Gt (n) of the supply NOx amount is defined as 0.

First, at step S201, the number n of the acquisition times of the post-catalyst NOx sensor maximum output value Crmax is counted up by 1. At step S202, the present supply NOx amount target value Gt (n) is found by adding a predetermined step amount ΔG to the previous supply NOx amount target value Gt (n−1). The step amount ΔG is 100 mg, for example, according to the example in FIG. 5.

Next, at step S203 it is determined whether or not the supply NOx amount G during lean burn operating has reached to the target value Gt (n), that is, whether or not the supply NOx amount G during lean burn operating is more than the target value Gt (n). When the supply NOx amount G during lean burn operating has not reached to the target value Gt (n), step S203 continues to be executed until it does. On the other hand, when the supply NOx amount G during lean burn operating has reached to the target value Gt (n), at step S204 the rich spike operation for supplying an amount of reducers corresponding to the supply NOx amount target value Gt (n) is performed.

Next, at step S205 the post-catalyst NOx sensor maximum output value Crmax (n) is acquired. Thereafter, at step S206 it is determined whether or not the number n of the acquisition times of the post-catalyst NOx sensor maximum output value Crmax is more than a predetermined value m. The predetermined value m is, for example, 5 according to the example in FIG. 5.

When the number n of the acquisition times is less than the predetermined value m, steps S201 to S205 are repeatedly executed. On the other hand, the number n of the acquisition times is more than the predetermined value m, that is, when n=5, the process goes to step S207. In consequence, the NOx of 100 mg to 500 mg is sequentially supplied to the NOx catalyst 16 by each 100 mg and the corresponding reducer amount is supplied to each supply NOx amount to acquire the post-catalyst NOx sensor maximum output value Crmax. That is, as a result, five sample points as shown in FIG. 5 can be acquired.

At step S207, by using the sample points where the post-catalyst NOx sensor maximum output value Crmax exceeds the predetermined value Crs, the regression lines L representing a relation between post-catalyst NOx sensor maximum output value Crmax and supply NOx amount G are determined. In addition, at step S208 a point x on the regression line L where the post-catalyst NOx sensor maximum output value Crmax comes to the predetermined value Crs is determined.

At step S209 the supply NOx amount Gx corresponding to the determined point x is acquired and the acquired supply NOx amount Gx is compared with the predetermined degradation determination value Gs. When the supply NOx amount Gx is more than the degradation determination value Gs, at step S210 it is determined that the NOx catalyst is normal and when the supply NOx amount Gx is less than the degradation determination value Gs, at step S211 it is determined that the NOx catalyst is degraded.

According to the second embodiment in regard to the NOx catalyst degradation diagnosis, the supply NOx amount G is increased from a value smaller than the degradation determination value Gs corresponding to the criteria in stages. In a case of the normal catalyst, since at an initial stage of the diagnosis, the supply NOx amount G is smaller than the NOx amount capable of being absorbed by the catalyst, even if the corresponding reducers are supplied, the reducers do not become excessive to restrict deterioration of the fuel consumption. The excessive reducer amount is supplied only when the NOx more than the NOx amount capable of being absorbed by the catalyst is supplied, that is the order of several times. Therefore, as long as the catalyst is maintained in a normal state, even if the degradation diagnosis is performed, deterioration of the fuel consumption is restricted to the minimum. On the other hand, in a case of the degraded catalyst, the reducers become excessive from the initial stage of the diagnosis, but in this case, it will be determined that the catalyst is degraded, to give a warning to a user and replace the catalyst. Therefore, deterioration of the fuel consumption at degradation diagnosis is prevented through a life cycle of the catalyst.

Figure 7:
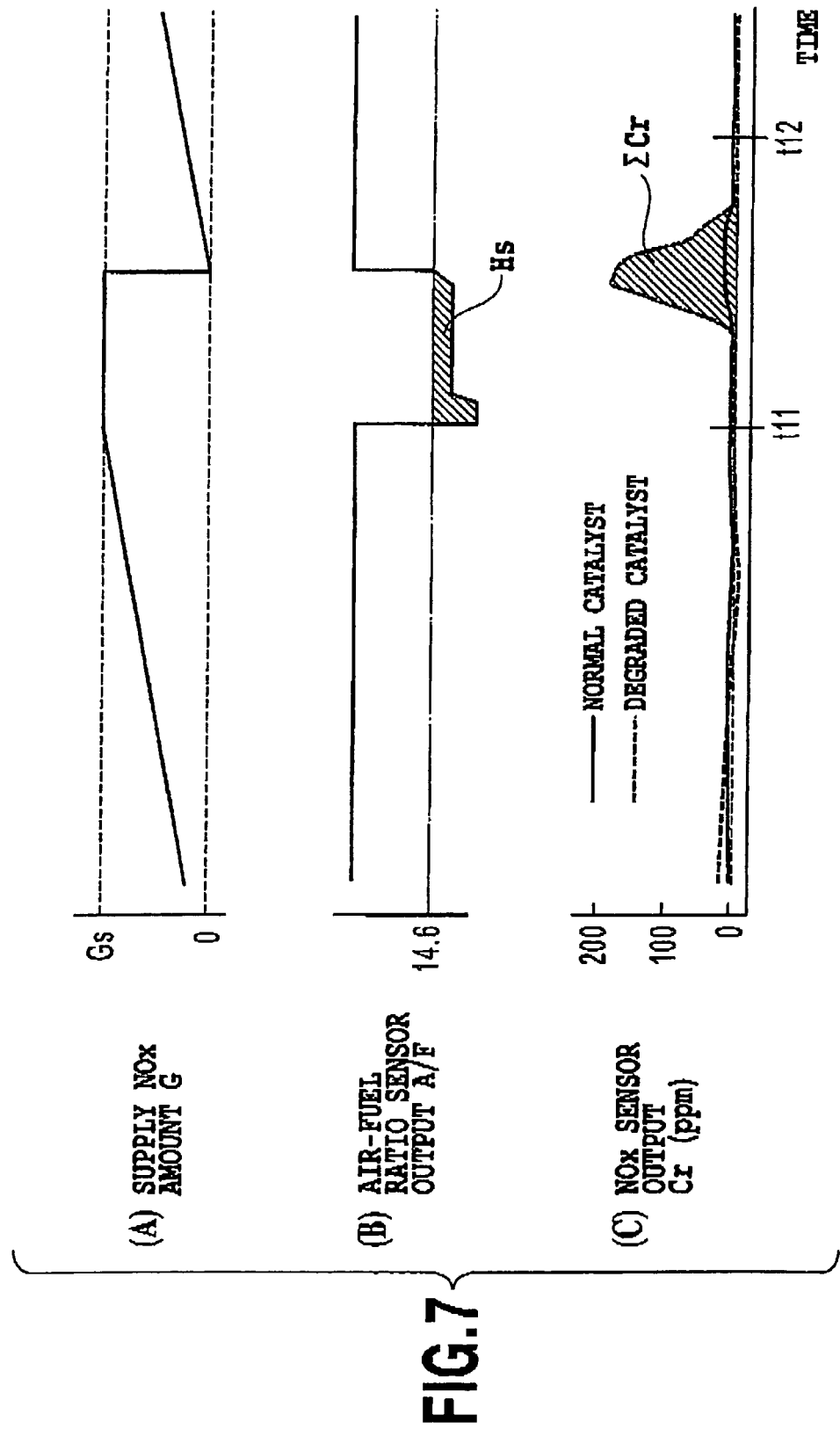
FIG. 7 is a time chart explaining a third embodiment for the NOx catalyst degradation diagnosis.

Next, a third embodiment of the degradation diagnosis will be explained with reference to FIG. 7. In the third embodiment, in the same way as the first embodiment described above, the NOx amount equal to the criteria NOx amount Gs is supplied to the NOx catalyst 16 during lean burn operating. As soon as the supply is completed, the rich spike operation is performed to supply the reducer amount Hs corresponding to the criteria NOx amount Gs. On the other hand, from a rich spike start point t11 to a predetermined point t12 after a predetermined time has elapsed (for example, 10 sec), values of the post-catalyst NOx sensor output value Cr are integrated to find the integral value Σ Cr. The predetermined point t12 is defined as a point at least after the rich spike operation completion point. On the other hand, the post-catalyst NOx sensor output integral value E Cr in a case of the criteria catalyst is in advance found through a production version test or the like and is set as the degradation determination value. In addition, the actually acquired post-catalyst NOx sensor output integral value ΣCr is compared with the degradation determination value ΣCrs. When ΣCr is less than ΣCrs, it is determined that the catalyst is normal and when ΣCr is more than ΣCrs, it is determined that the catalyst is degraded. That is, this method performs the degradation determination based upon the sensor output value, but a method of performing the degradation determination by using the integral value, not using a magnitude of the value or the maximum value.

As described above, the embodiments of the present invention are explained, but the present invention may adopt other embodiments. For example, in the aforementioned embodiment, the conversion value to the NOx concentration is used as a value in regard to the posy-catalyst NOx sensor output value, but a current value itself outputted from the posy-catalyst NOx sensor may be used.

The embodiment of the present invention is not limited to the aforementioned embodiments, but all modifications, applications and equivalents contained in the spirit of the present invention specified by the appendix claims can be included in the present invention. Therefore, the present invention should not be construed in a limit way, but may be applied to other arbitrary technologies included within the scope of the spirit of the present invention.

INDUSTRIAL APPLICABILITY

The present invention is applicable to a NOx storage reduction catalyst provided in an exhaust passage for an internal combustion engine.

The invention claimed is:

1. A degradation diagnostic apparatus for a NOx catalyst comprising:
    a NOx storage reduction catalyst arranged in an exhaust passage of an internal combustion engine;
    an NOx sensor that detects ammonium arranged downstream of the NOx catalyst; and
    an electronic control unit configured to control, from a fresh product state to a state of degradation of the NOx catalyst, executions of rich spike operations, wherein during each rich spike operation, a criteria reducer amount is supplied to the NOx storage reduction catalyst for desorbing absorbed NOx, wherein the criteria reducer amount is a reducer amount which corresponds to a NOx amount that a criteria catalyst, as a boundary between degradation and normality can absorb, wherein each execution of a rich spike operation does not result in ammonium being discharged from the NOx catalyst until the NOx catalyst is degraded over a criteria state, wherein the electronic control unit is further configured to determine degradation of the NOx catalyst based the amount of ammonium detected by the NOx sensor when the supplied criteria reducer amount is supplied to the NOx catalyst, wherein
    when the electronic control unit determines that the NOx storage reduction catalyst is degraded, a warning is given to a user.

2. The degradation diagnostic apparatus for the NOx catalyst according to claim 1, wherein:
    the electronic control unit is further configured to calculate a NOx amount supplied to the NOx catalyst, wherein;
    when the electronic control unit calculates a supply NOx amount equal to the NOx amount which the criteria catalyst can absorb, the electronic control unit controls the supply amount of the reducers to correspond to the NOx amount which the criteria catalyst can absorb.

3. The degradation diagnostic apparatus for the NOx catalyst according to claim 1, wherein:
    the electronic control unit determines that the NOx catalyst is degraded when an output value of the NOx sensor is more than a predetermined degradation determination value.

4. A degradation diagnostic apparatus for a NOx catalyst comprising:
    a NOx storage reduction catalyst arranged in an exhaust passage for an internal combustion engine;
    a NOx sensor arranged downstream of the NOx storage reduction catalyst; and
    an electronic control unit, wherein the electronic control unit is configured to control the execution of a rich spike operation, wherein during the rich spike operation, an amount of reducers are supplied to the NOx storage reduction catalyst for desorbing the absorbed NOx, configured to calculate a NOx amount supplied to the NOx catalyst, and configured to determine degradation of the NOx catalyst, wherein:
        when the supplied NOx amount calculated by the electronic control unit reaches a predetermined value, the electronic control unit controls the supply amount of the reducers to correspond to the supplied NOx amount, the supplied NOx amount and the supplied reducers amount are in stages increased to acquire a maximum output value of the NOx sensor at each stage, and the electronic control unit determines the degradation of the NOx catalyst based upon a supplied NOx amount corresponding to at least one of the acquired NOx sensor maximum output values, and the electronic control unit determines a regression line representing a relation with the supplied NOx amount in regard to the NOx sensor maximum output value which is more than a predetermined threshold value, determines a supply NOx amount corresponding to the threshold value on the regression line, and determines the degradation of the NOx catalyst by comparing the determined supplied NOx amount with a predetermined degradation determination value.

5. The degradation diagnostic apparatus for the NOx catalyst according to claim 4, wherein:
the electronic control unit determines the degradation of the NOx catalyst by comparing a minimum value of the supplied NOx amounts corresponding to the NOx sensor maximum output values which are more than a predetermined threshold value with a predetermined degradation determination value.

6. The degradation diagnostic apparatus for the NOx catalyst according to claim 5, wherein:
the predetermined degradation determination value is a value equal to a NOx amount which can be absorbed by a criteria catalyst has as a boundary between degradation and normality.

* * * * *